Jan. 1, 1957   O. BAIER   2,775,898
POWER-DRIVEN HAND DEVICE TO BE USED
AS A TOOL FOR MULTIPLE PURPOSES
Filed June 25, 1953

INVENTOR
O. Baier
ATTYS.

United States Patent Office 2,775,898
Patented Jan. 1, 1957

2,775,898
POWER-DRIVEN HAND DEVICE TO BE USED AS A TOOL FOR MULTIPLE PURPOSES

Otto Baier, Ludwigsburg, Germany
Application June 25, 1953, Serial No. 364,154
Claims priority, application Germany March 12, 1953
1 Claim. (Cl. 74—22)

This invention relates to a power-driven hand device in which several tools are assembled in a single unit. The new hand device is more particularly intended for use at building places, for which purpose it is preferably provided with an electric drive; instead of which, however, a compressed air motor or the like may be used.

The object of the invention is to provide a tool which will be useful for several possible applications, for instance for use by electrical fitters who not only have to cut lengths of flat material, pipes and profiled rods but must also carry out drilling of iron parts and of masonry.

Hand devices are already known which are more particularly intended for sheet iron working and in which to a motor casing provided with a handle, there is attached a casing provided with a keyhole saw, the to and fro movement of which is effected by an extension of the motor shaft, by means of a pin provided on the shank of the keyhole saw in conjunction with a cam groove provided on the extension of the motor shaft. In these known hand devices the extension terminates in a conical portion, on which a drill chuck is placed after removal of a closing cover.

Electrically driven hand devices are also known in which a counter-holder capable of being placed against the work-piece and provided next to a circular saw blade is adjustably secured to the casing. By means of this counter-holder which, when used, is placed against the work-piece, the circular saw blade, the rotation of which is directed towards the counter-holder is pulled tight against the work-piece and the sawing operation is carried out without the operator exerting the least effort.

In contradistinction to these known hand devices, according to the invention, a number of tools are assembled in a casing unit, namely a circular metal saw and a drill shank for two kinds of drilling, which, when suitable drills are inserted into the drill chuck that is provided, can be used for ordinary drilling of iron parts, wooden parts and the like, as well as for percussion drilling, that is to say be used for drilling through bricks, masonry, concrete or the like.

According to the invention, the hand device is composed of a motor or gear casing and of a tool casing in which there is accommodated the driving spindles for the tools, a speed reducing gear and a worm gear for the circular saw blade being provided in a known manner. The driving shank carrying the drill chuck is placed over the spindle carrying the worm of the worm gear in the tool casing, and a change speed gear is associated therewith, the small pinion of which is mounted on the worm spindle.

The possibility provided by the invention of changing the drill spindle shank from only a rotary movement to a rotary and percussion to and fro movement is attained by this that the end surface of the shank is provided with a cam surface with which engages a similar cam surface of a shank insertion member, whereby the latter can be fixed in position by a simple device. When the shank insertion member is not arrested, it runs round with the drill spindle shank, forming a continuation thereof, and when the shank insertion member is kept fixed in position, the percussion drilling movement is carried out during the rolling of the cam surface provided on the end surface of the drill shank over the cam surface of the stationary shank insertion member, whereby the extent of the desired percussion movement can be determined by a corresponding number of raised parts and depressions on the cam surfaces.

The device for fixing the shank insertion member in position may simply consist of a holding pin which is provided in the wall of the casing and can be inserted into a hole provided in the shank insertion member.

In carrying the invention into effect a disc cover used for closing the part of the casing surrounding the saw blade may be provided with a handle, which may be used as a second handle when the device is being operated.

The accompanying drawing illustrates an electrically driven hand device as an example of construction according to the invention.

Figure 1:
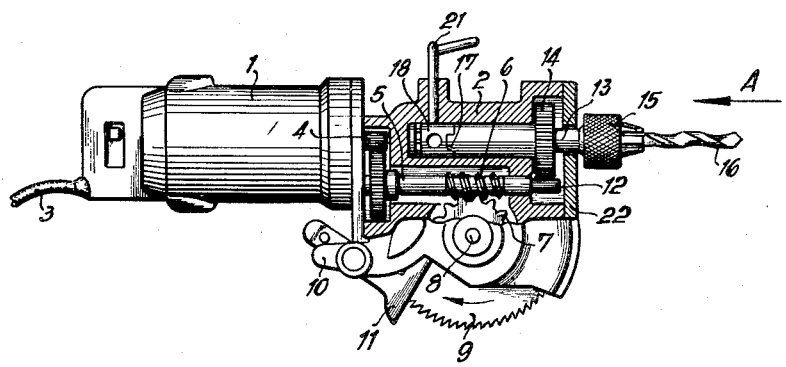
Figure 1 is a longitudinal section of the new hand device, partly in side elevation.
Figure 2:
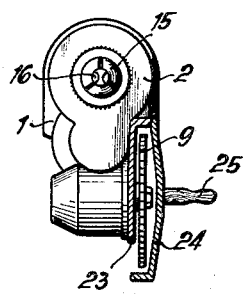
Figure 2 is a front elevation, seen in the direction of A of Figure 1.
Figure 3:
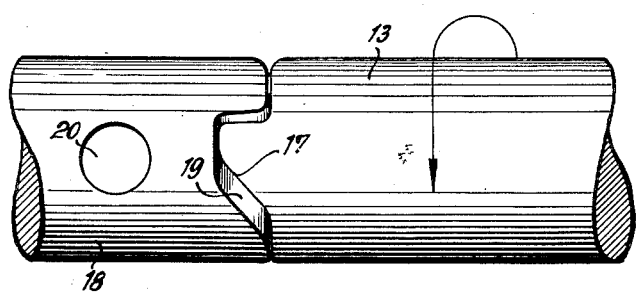
Fig. 3 shows on an enlarged scale the interengaging front cam surfaces on the ends of the drill spindle shank and shank insertion member.

The hand device, which is for instance provided with an electric drive, consists of the motor casing 1 and the tool casing 2. The current is supplied through a cable 3. The worm shaft 5 is driven by the motor shaft, which is not shown, through the interposition of a speed reducing gear 4, the worm 6 of which shaft drives the shaft 8 of the circular saw blade 9 through the worm wheel 7.

An adjustable counter-holder 11 is pivoted to a support 10 provided on the tool casing 2, which counter-holder is placed against the work-piece when flat material, pipes and profiled rods are being cut. The end of the worm shaft 5 is provided with a pinion 12, which forms a change speed gear with a toothed wheel 14 mounted on the drill spindle shank 13.

The end of the drill spindle shank 13 which projects out of the tool casing 2 is provided with a drill chuck 15 to receive drills 16, and the other end of the drill spindle shaft is formed with a cam surface 17. In the bearing bore provided in the tool casing 2 for the drill spindle shank 13 there is fitted a shank insertion member 18 on the one end surface of which there is also provided a cam surface 19 corresponding to the cam surface 17 of the drill spindle shank. The shank insertion member 18 is provided with a hole 20, into which a holding pin 21 provided in the tool casing 2 can be inserted when the drill spindle shank 13 has to be used to carry out drilling and percussion movements.

The part of the casing accommodating the change speed gear consisting of the toothed wheels 12 and 14 may be closed by a removable cover 22, so that the change speed gear can be made accessible at any time.

The lateral covering of the part 23 of the casing surrounding the circular saw blade 9 is effected by means of a disc cover 24, which is provided with a handle 25.

I claim:

A drill spindle means comprising an elongated shank supported in a cylindrical sleeve, and a projecting end carrying a drill chuck, a thrust bearing in said sleeve at the end of said shank remote from said chuck, said shank comprising two sections having interengaging cam surfaces, means by which the section of said shank adjacent said thrust bearing may be secured against rotation, and means to positively rotate the section of said shank on which said chuck is mounted.

References Cited in the file of this patent
UNITED STATES PATENTS

| 1,530,886 | Gora | Mar. 24, 1925 |
| 1,559,720 | McCray | Nov. 3, 1925 |
| 2,531,849 | Karleen | Nov. 28, 1950 |